UNITED STATES PATENT OFFICE.

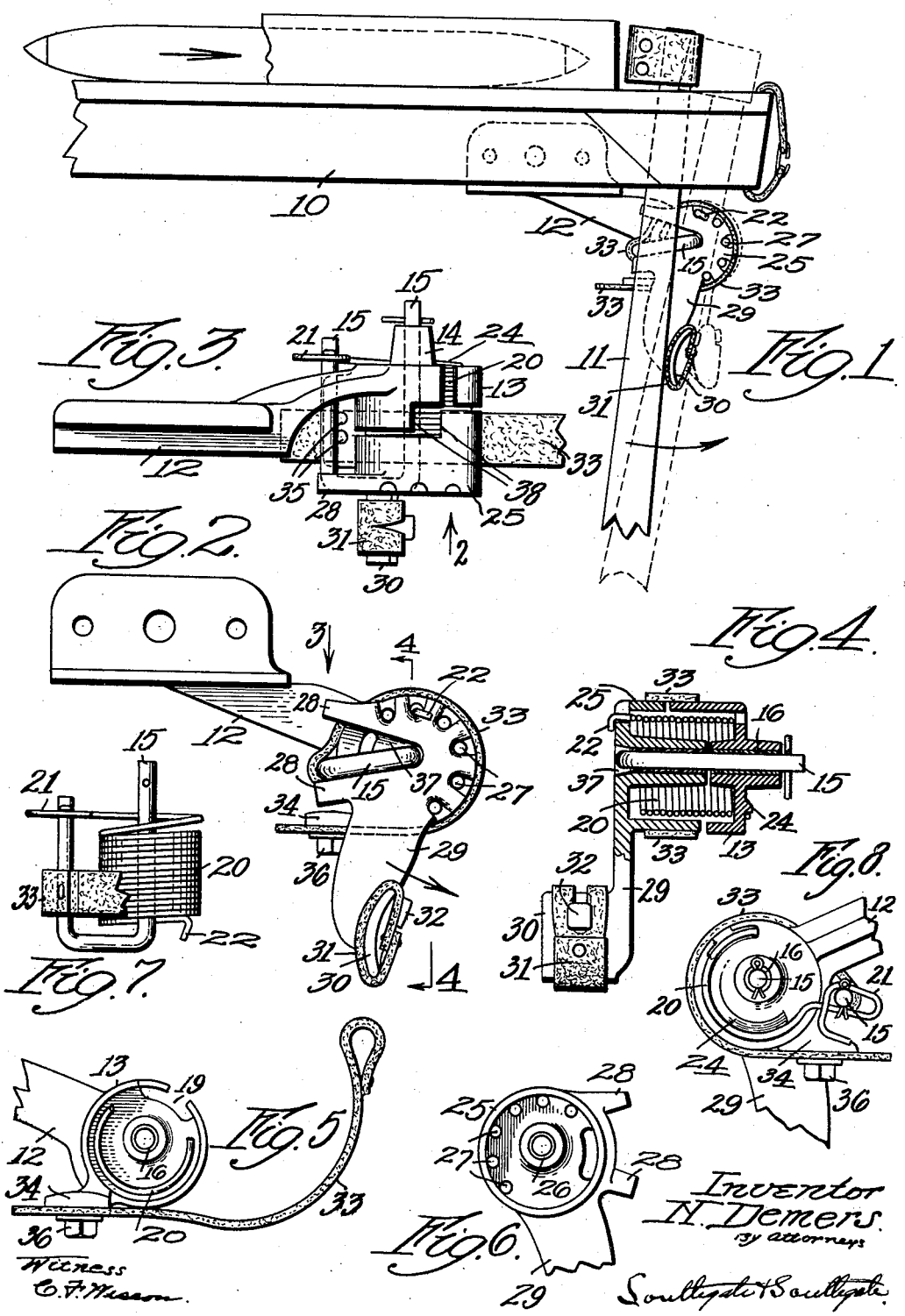

NAZAIRE DEMERS, OF WORCESTER, MASSACHUSETTS.

PICKER-CHECK.

1,312,960.  Specification of Letters Patent.  Patented Aug. 12, 1919.

Application filed August 21, 1918. Serial No. 250,857.

*To all whom it may concern:*

Be it known that I, NAZAIRE DEMERS, a citizen of the United States, residing at Worcester, in the county of Worcester and State of Massachusetts, have invented a new and useful Picker-Check, of which the following is a specification.

This invention relates to a device for checking the picker of a loom on its back stroke, and the principal objects thereof are to provide a simple device for letting the picker back quickly, but with a spring resistance behind it and causing it to return more slowly to its normal position, to provide a construction in which the impact of the picker stick will be resisted by spring pressure almost alone at first, and immediately by frictional resistance, which latter will continue until the picker stick moves back out of the way; to provide simple adjustments and to provide a construction which will have few parts that are likely to wear or get out of order.

Further objects and advantages of the invention will appear hereinafter.

Reference is to be had to the accompanying drawings, in which—

Figure 1 is a rear elevation of a portion of a lay with a preferred embodiment of this invention shown thereon;

Fig. 2 is a similar view showing the check alone on enlarged scale;

Fig. 3 is a plan of the check;

Fig. 4 is a sectional view on the line 4—4 of Fig. 2;

Fig. 5 is an inside view of part of the device with the rest of it removed;

Fig. 6 is a similar view of the other portion;

Fig. 7 is a view of the spring showing its connections, and Fig. 8 is a front view of the device.

The invention is shown as applied to a loom having an ordinary lay 10 and picker stick 11. On the lay is mounted a bracket 12 for supporting a check constructed in accordance with this invention. This bracket is provided with a cylindrical hub 13 hollow on one side and having an eccentric boss 14 extending out of one side near the center thereof. This boss is provided with a perforation concentric with it, but eccentric with respect to the hub 13 and constituting a bearing for a shaft or rod 15. I have shown a bushing 16 in the bearing. This shaft or rod is shown as of U-shaped construction and is held in place by a cotter-pin or the like, its other arm extending outside the friction device.

Inside the hollow hub 13 is a cylindrical coil spring 20. One end of this spring, which constitutes a portion of one of the coils, is adapted to pass out of the hub through an opening 19 and is capable of turning in a groove on the back side of the hub concentric with the exterior thereof. Thus the last coil is on the outside and so it holds the spring firmly against side motion. The extreme end 21 of this spring constitutes two loops each for receiving the short arm of the U-shaped rod 15. The other end of the spring at 22 is turned at right angles and adapted to be connected with the other member of the device, as will appear. This other member is in the form of a cylindrical hub 25 concentric with the hub 13 and having a perforation or bearing with a bushing 26 therein concentric with the perforation in the projecting boss 14, and eccentric with respect to the hub 25. This receives the shaft 15 through it. This hub 25 is provided with a series of perforations 27 arranged in the arc of a circle, each one adapted to receive the end 22 so that the tension of the spring can be adjusted by placing the end 22 in any desired one of these perforations. This end 22 is hook shaped, so that acting with the external coil at the other end the spring holds the two hubs 13 and 25 together and prevents their separation. On the hub 13 is a curved rib 24, against which the coil of the spring bears. This increases the resistance of the spring when the picker-stick hits the check. When the tension of the spring is to be adjusted the loop end 21 of the spring is disengaged from the rod 15. Then the rod 15 is pushed back so as to let the hub 25 be moved to disengage the end 22. This end 22 is then turned and entered in the proper perforation 27 and the parts reassembled. If the tension is not exactly right it can be adjusted further by putting the end of the rod 15 into either of the parts of the loop end 21.

This hub 25 has two arms 28 spaced apart, and on its front side the space between these two arms is depressed all way to the center to receive the straight connecting portion of the U-shaped rod 15 and limit the action of the parts. This hub 25 has an arm 29 provided with a projection 30 adapted to be covered with a strip of leather 31 or the like in position for receiving the impact of the picker stick. A headed lug 32 is provided for readily receiving and holding the strip.

The short end of the rod 15 not only receives the loop 21 constituting one end of the spring 20, but it also receives a loop constituting the end of a friction member 33 preferably in the form of a leather strap having a slot in its end. This strap passes over the substantially cylindrical outer surfaces of the two hubs 13 and 25 and is fastened at the end to a stationary projection 34 on the bracket 12 in about the same position as the other end of the strap. This projection is provided with a plurality of screw holes 35 for receiving a screw 36 for entering the slot and adjusting this friction member sidewise so that more or less of it can came into contact with the oscillating hub 25, and thus control the frictional resistance thereof. It can be adjusted lengthwise also because the screw is screwed up tight to hold it. This permits of putting the strap in two or any desired number of different positions in which case its surface engaging the oscillating hub 25 will be varied. The other hub 13 supports part of the strap in all positions, and the amount by which the strap overlaps the eccentric side of the hub 25 controls the amount of friction. The U-shaped rod 15 acts as a stop against both walls of the depression 37. Also if the strap 33 should break the edges 38 act as a positive stop.

It is to be noted that I have stated that the U-shaped rod 15 passes through the perforations in the two hub members 25 and 13, and that these perforations are eccentric with respect to the exterior cylindrical surfaces of these members. In the position shown in the figures, that is arranged above the center so that there is more space below it than above it, and consequently as the arm 29 moves back under the impact of the picker stick it forces the cylindrical portion of the oscillating hub 25 backwardly against the strap 33 and increases the friction.

The operation of the device is as follows: When the picker stick moves back in the direction of the arrow in Fig. 1 it of course engages the end of the arm 29 and forces it back with it, but it is always against the resistance of the spring 20 that this arm moves. That resistance having been adjusted by placing the end 22 in the proper hole 27, it will resist the action of the picker stick enough to slow it down, but still let it come back with enough speed to avoid too sudden a check. But toward the end of the stroke the eccentricity of the connection between the hub 25 and the rod 15 operates to force the external surface of the hub into firm contact with the strap 33 and this puts on the friction brake in addition to the spring resistance. Thus the final slowing action is caused by both the action of the spring and the frictional resistance, while in the beginning it is resisted only by the spring.

When the arm 29 gets to its limiting position, as shown in dotted lines in Fig. 1 the picker is fully checked of course. The picker then leaves contact with the arm 29. The turning of the arm releases the friction and leaves only the spring to force this member back which it does very quickly.

It is to be observed that there is a pause at the end of the stroke before the arm 29 starts back, but that almost immediately after it does start back it will begin to operate quickly.

Although I have illustrated and described only one form of the invention I am aware of the fact that many modifications can be made therein by any person skilled in the art without departing from the scope of the invention as expressed in the claims. Therefore I do not wish to be limited to all the details of construction herein shown and described, but what I do claim is:—

1. In a picker check, the combination of two members, one oscillatable, said members being substantially in registration with each other, a strap passing over said members partially in contact with each one to exert frictional resistance to the oscillation of the oscillatable one, and a spring exerting a resistance to the motion of the oscillatable member in one direction and for returning it to normal position after it has been moved out of said position.

2. In a loom, the combination with a picker stick, of a check therefor comprising a movable hub having an arm, a spring constantly resisting the motion of the hub and arm backwardly, and a frictional device comprising a strap in contact with said hub arranged to start into action to assist the spring later.

3. In a loom, the combination with a picker stick, of a check therefor comprising a movable member having an arm, a spring constantly resisting the motion of the arm backwardly when the picker-stick strikes it, a frictional device in contact with said member and arranged to come into action afterward to assist the spring, whereby the checking action will increase gradually, and means whereby the frictional resistance on said member will be removed suddenly while the spring is still in action to allow a quick return of said arm.

4. In a picker check, the combination of two substantially cylindrical hubs, one stationary and the other oscillatable about an eccentric axis, said hubs being substantially in registration with each other, a strap passing over said hubs partially in contact with each one to exert frictional resistance to the oscillation of the oscillatable one, and a spring exerting a resistance to the motion of the oscillatable hub in one direction and for returning it to normal position after it has been moved out of said position.

5. In a picker check, the combination of a stationary hub and an oscillatable hub in registration therewith, a shaft eccentrically passing through said hub for supporting the oscillatable one, a strap passing over said hubs and contacting partly with each one, whereby when the movable hub turns on its eccentric axis it will come in contact with the strap which will exert a frictional resistance on it, and a spring having one end connected with the oscillatable hub for resisting its motion in one direction.

6. In a picker check, the combination of two substantially cylindrical hubs, one stationary and the other oscillatable about an eccentric axis, a strap passing over said hubs partially in contact with each one to exert frictional resistance to the oscillation of the movable one, said strap being adjustable to regulate the amount of its surface which engages the oscillatable hub, and a spring for exerting a resistance to the motion of the movable hub in one direction.

7. In a picker check, the combination of two substantially cylindrical hubs, one stationary and the other oscillatable about an eccentric axis, said hubs being in registration with each other, a strap passing over said hubs partially in contact with each one to exert frictional resistance to the oscillation of the movable one, a spring inside said hubs connected with the oscillatable one for exerting a spring resistance to its motion in one direction and for returning it to normal position after it has been moved out of said position, and a rod passing through the centers of the hubs eccentrically and having an arm thereon outside said hub to which one end of the spring is connected.

8. In a picker check, the combination of two substantially cylindrical hubs, one stationary and the other oscillatable about an axis, said hubs being in registration with each other, a cylindrical coiled spring inside said hubs adjustably connected with the oscillatable one for exerting a spring resistance to its motion in one direction and for returning it to normal position after it has been moved out of said position, and a rod passing through the centers of the hubs and having an arm thereon outside said hub to which one end of the spring is connected.

9. In a picker check, the combination of two substantially cylindrical hubs, one stationary and the other oscillatable about an eccentric axis, a strap passing over said hubs partially in contact with each one to exert frictional resistance to the oscillation of the movable one, a spring connected with one of them for exerting a spring resistance to its motion in one direction and returning it to normal position after it has been moved out of said position, and a rod passing through the centers of the hubs eccentrically and having an arm thereon outside said hub to which one end of the spring is connected and also one end of said strap.

10. In a picker check, the combination of two substantially cylindrical hubs, one stationary and the other oscillatable about an eccentric axis, said hubs being in registration with each other, a U-shaped rod having one leg serving as the center of oscillation of said hub, a strap passing over said hubs partially in contact with each one to exert frictional resistance to the oscillation of the movable one, and a spring inside said hubs for exerting a spring resistance to the motion of the movable hub in one direction, said oscillatable hub having two arms projecting therefrom between which the bend of said rod is located, the strap and spring being connected with the free arm of said rod.

11. In a picker check, the combination of two substantially cylindrical hubs, one stationary and the other oscillatable about an eccentric axis, a strap passing over said hubs partially in contact with each one to exert frictional resistance to the oscillation of the movable one, and a rod passing through the centers of the hubs eccentrically and having an arm thereon outside said hub to which one end of the strap is connected.

In testimony whereof I have hereunto affixed my signature.

NAZAIRE DEMERS.

Copies of this patent may be obtained for five cents each, by addressing the "Commissioner of Patents, Washington, D. C."